April 19, 1955 R. CHAPLIK 2,706,444
AUTOMATIC COFFEE MAKERS
Filed July 27, 1951 5 Sheets-Sheet 1
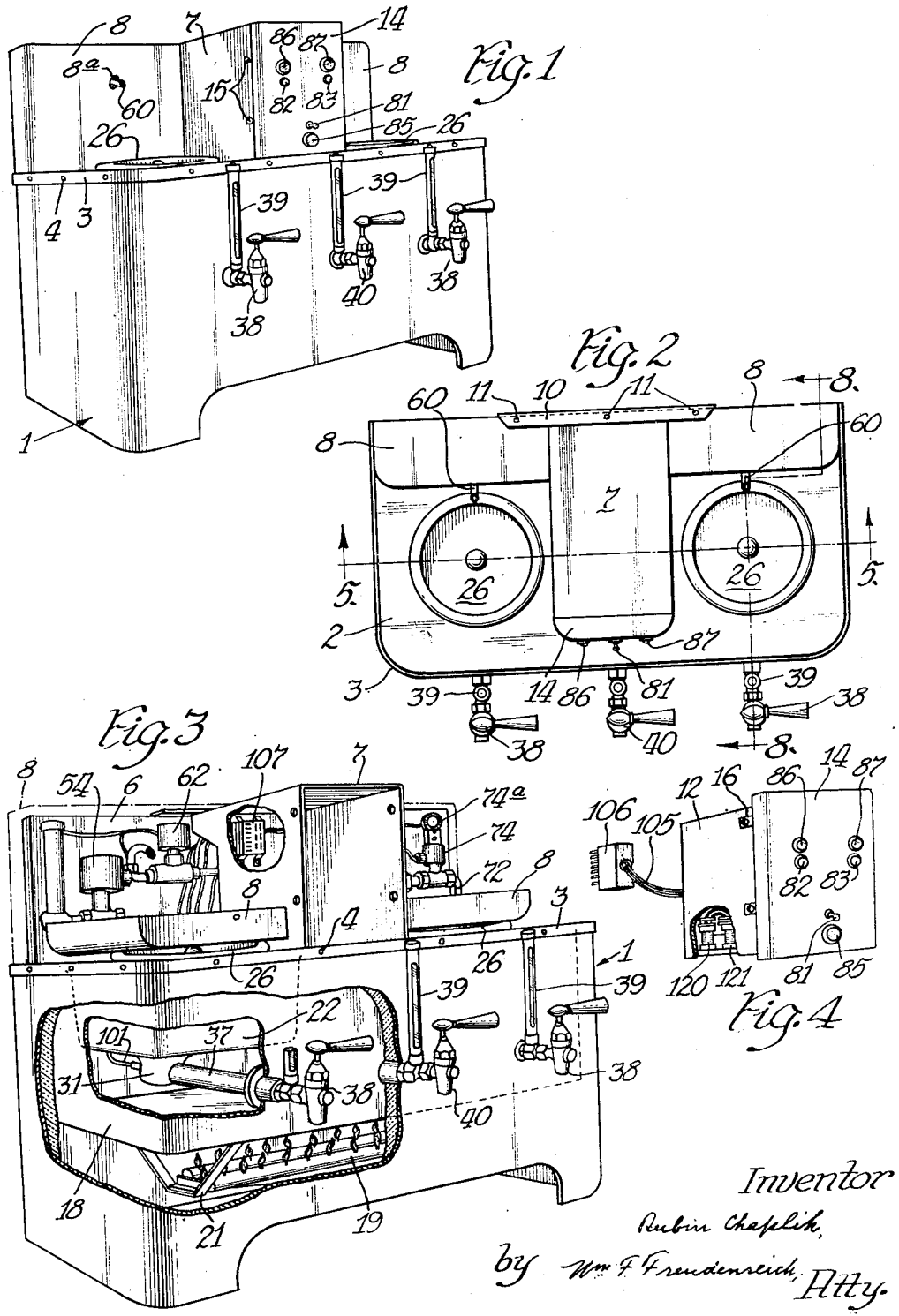
Inventor
Rubin Chaplik,
by Wm F Freudenreich, Atty.

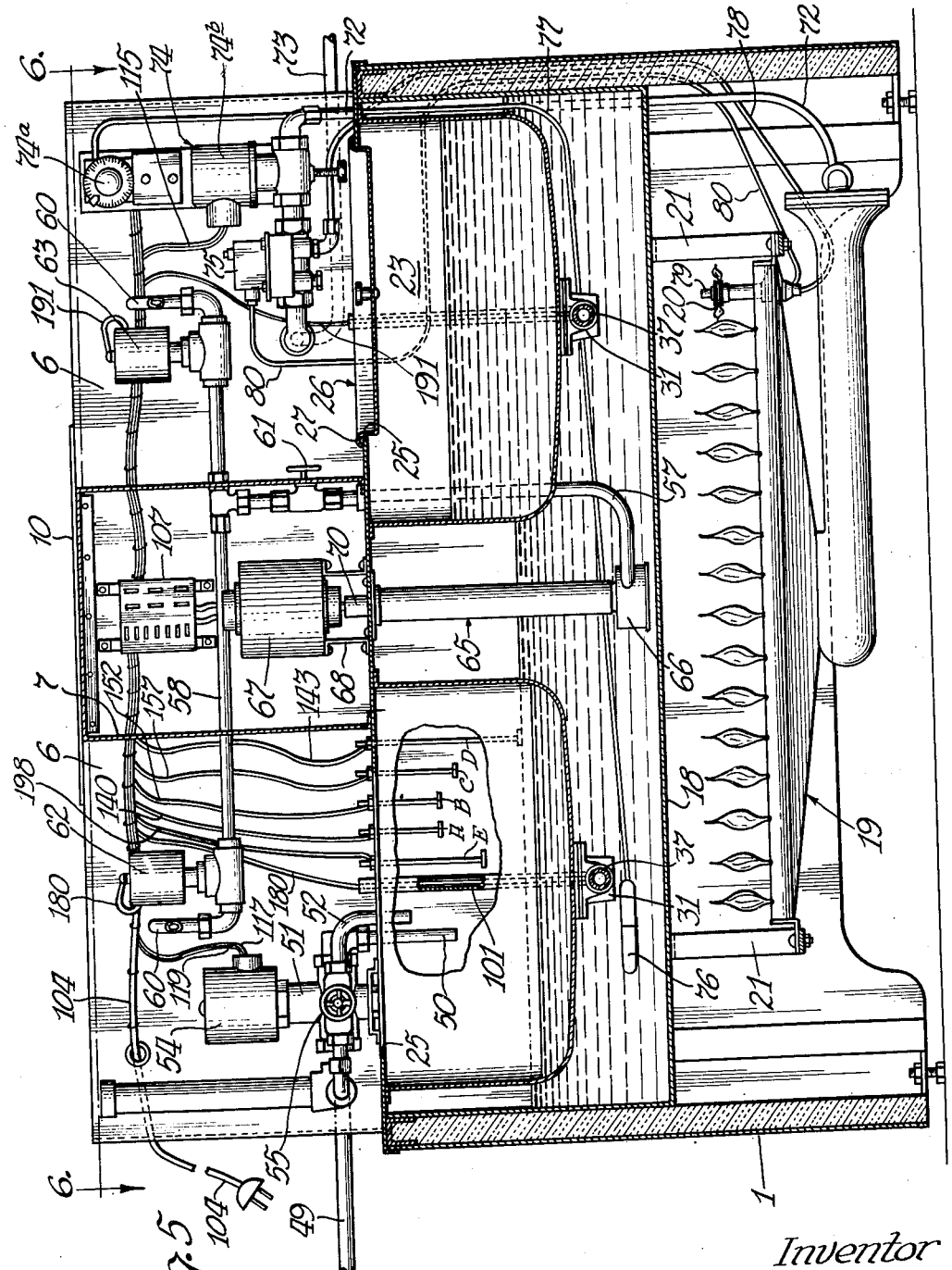

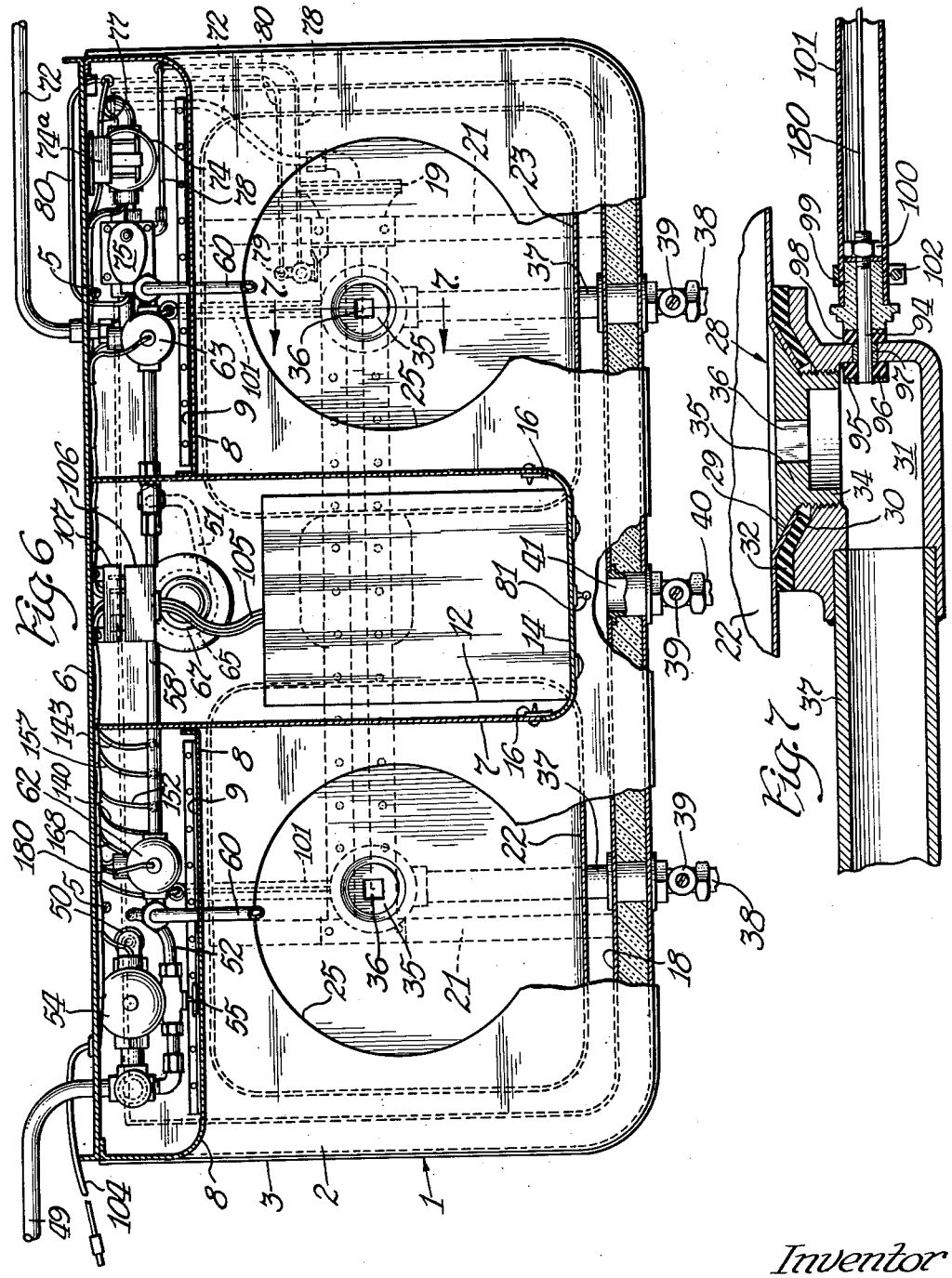

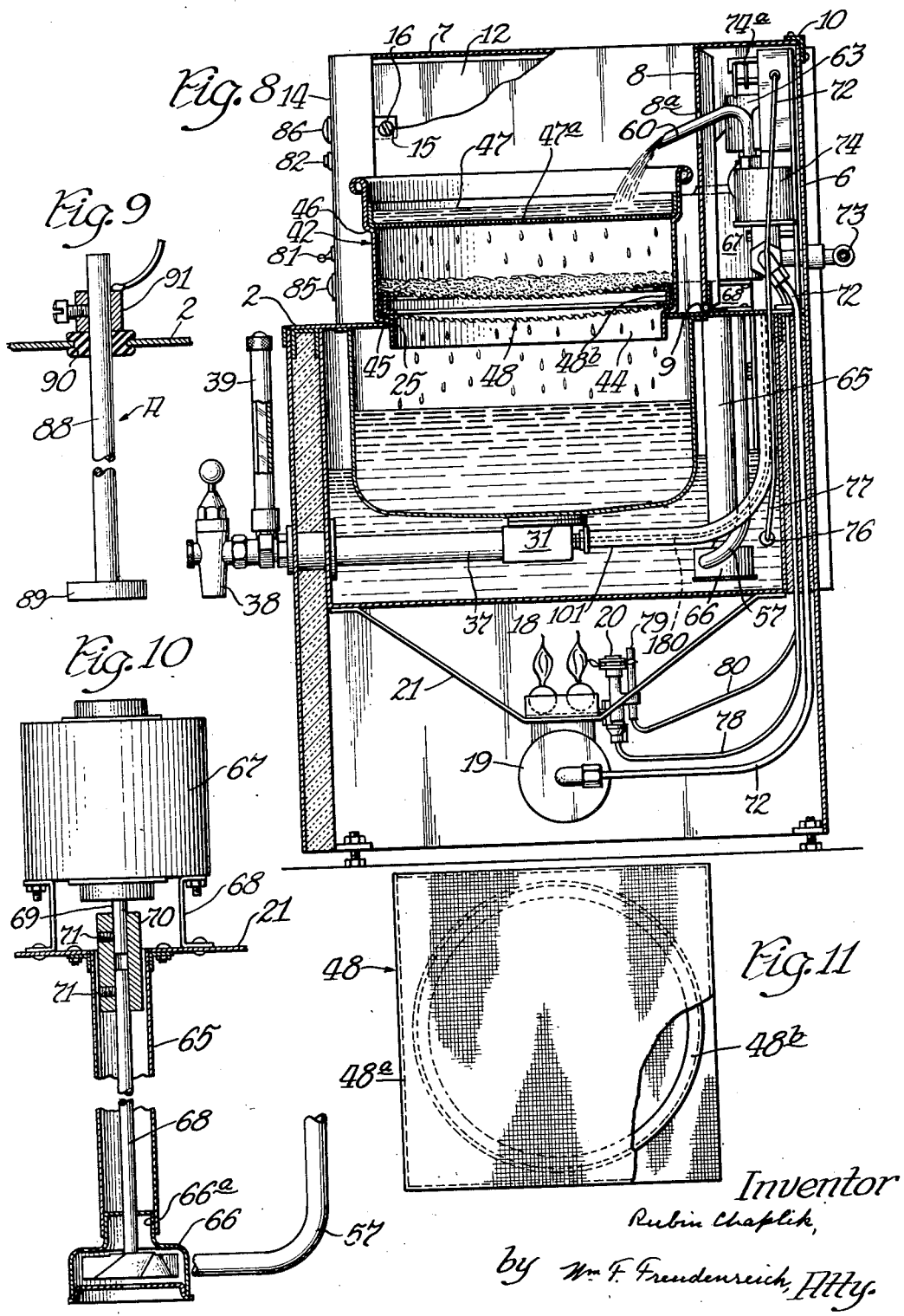

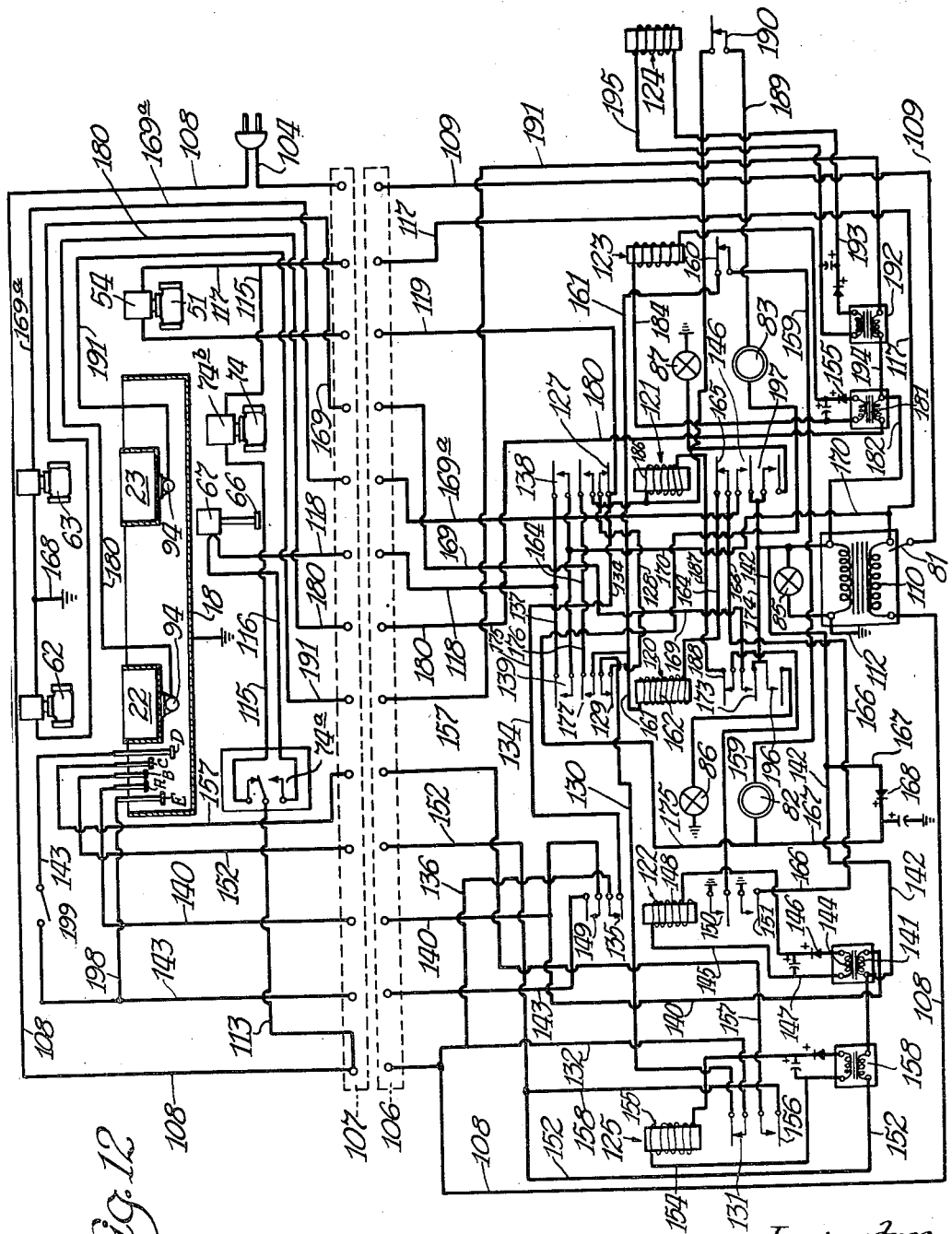

United States Patent Office 2,706,444
Patented Apr. 19, 1955

2,706,444

AUTOMATIC COFFEE MAKERS

Rubin Chaplik, Chicago, Ill.

Application July 27, 1951, Serial No. 238,917

11 Claims. (Cl. 99—282)

The object of the present invention is to produce a novel apparatus that shall make the brewing of uniformly good coffee highly efficient, and automatic to such a degree that failure due to human frailty shall be practically eliminated.

Subsidiary objects of the invention are to produce automatic means for accurately measuring the water, heating it to the proper temperature, properly timing the brewing procedure, and maintaining the brew at the proper temperature for use.

Further objects are to create an apparatus that is safe, easy to keep clean, internally and externally, and in which all the power and control mechanisms are behind protective walls, but may quickly be exposed for inspection, adjustment, repair or replacement.

A further object of the invention is to produce an attractive, simple and novel cabinet or housing for the coffee making apparatus, a removable section of which serves as a container within which is sealed control mechanism that simply plugs into the mechanism controlled thereby.

A further object of the invention is to produce novel means serving to brew accurately measured quantities of coffee in a brewing receptacle or extractor, and make it impossible to make a subsequent brewing until after all of the coffee in the previous brew is dispensed.

A further object of the invention is to produce a simple and novel twin receptacle coffee maker in which coffee can be brewed in one receptacle at a time and wherein no hot water for brewing can be delivered into either receptacle while water is flowing into the other receptacle.

The various features of novelty whereby the present invention is characterized will hereinafter be pointed out with particularity in the claims, but, for a full understanding of the invention and of its objects and advantages, reference may be had to the following detailed description taken in connection with the accompanying drawings, wherein:

Figure 1 is a perspective view of a coffee maker embodying the present invention; Fig. 2 is a top plan view of the coffee maker; Fig. 3 is a view similar to Fig. 1, on a somewhat larger scale, with parts removed or displaced and parts of the cabinet broken away; Fig. 4 is a perspective view of an auxiliary casing omitted from Fig. 3, with a fragment of a side wall broken away; Fig. 5 is a section, on a still larger scale, on line 5—5 of Fig. 2, the two swinging panels and a removable auxiliary casing being omitted; Fig. 6 is a section on line 6—6 of Fig. 5; Fig. 7 is a section, on a still larger scale, on line 7—7 of Fig. 6; Fig. 8 is a section, on the same scale as Fig. 6, on line 8—8 of Fig. 2; Fig. 9 is an elevational view of one of the electrodes or probes, with the immediate supporting means therefor shown in section; Fig. 10 is a view, partly in section and partly in elevation, of the pump; Fig. 11 is a plan view, with a fragment broken away, of the strainer on which the coffee rests during the brewing operation; and Fig. 12 is a diagram illustrating the control system and the parts controlled thereby.

Referring to the drawing, 1 is a long low casing, preferably of stainless steel, provided with a tablelike top 2 held on along the front and at the two ends by a molding 3. The molding is fastened to the vertical walls of the casing by screws 4. Two screws 5, best shown in Fig. 6, fasten the top of the casing, or table, at the rear, to the body or base portion. The top or table may therefore be removed easily. The rear wall 6 of the casing rises well above the table. Midway between the ends of and resting on the table is a hood 7 in the form of an inverted U, extending from wall 6 almost to the front edge of the table; this hood being open at both the front and rear ends. Arranged on opposite sides of the hood are two pan-shaped panels 8, 8 the concave sides of which face wall 6. These panels are attached to the structure, at their lower ends, as best shown in Fig. 8, by hinges 9, that permit them to swing from upright positions against wall 6 to the horizontal positions which they occupy in Fig. 3. The hood and the swinging panels are as high as wall 6 and their combined widths equal the length of the table. Fixed to the top of wall 6 is a forwardly projecting flange 10 that overlies the rear end of the hood 7 and extends laterally a short distance over each of the swinging panels. Three screws 11, extend down through this flange, one into the top of the hood and the others into the panels. One of these screws therefore helps to secure the hood; whereas the other two serve to lock the panels in upright positions, when the screws are tightened, and to leave the panels free to swing down when the screws are backed off.

Adapted to be housed within hood 7 is an auxiliary casing 12 which is a sealed, box-like structure, the front wall 14 of which projects beyond the two vertical side walls and above the top wall thereof. Wall 14 is thickwalls and has rounded vertical corners similar to the rounded corners of panels 8. In use, the auxiliary casing fits within the hood, except for the front wall 14 which abuts against the front end of the hood. Normally the auxiliary casing is held in place by a few screws 15 that extend through the side walls of the hood, near the front, into lugs 16 and the thin side walls of the auxiliary casing.

On the inner sides of the four vertical walls of the main casing are thick slabs 17 of insulating material; the insulation covering the entire front and end walls, but only the upper half of the rear wall. In the upper half of the main casing and, in effect, forming a lining for that part thereof, is a sheet metal tank 18 for water. Since this particular casing has been designed for heating water with gas burners instead of electrically, which would permit the heating element to be immersed in the water, a long gas burner 19, with its accompanying pilot burner 20, is mounted within the casing, below the tank. The burner 19 is shown as being suspended from the under side of the tank by hangers 21.

Within the water tank are twin receptacles 22 and 23 to receive and store coffee after it has been brewed. These receptacles are large, square pots, with rounded corners and a bottom that slopes from all sides to the center, attached to the under side of the table in registration with large, round pot openings 25 in the table to receive brewing units. The receptacles are shallower than the tank so that considerable space is left within the tank below the receptacles. Except while coffee is brewing in a receptacle, the corresponding opening 25 is closed by a lid 26. This lid is a shallow, round pan which, as best shown in Fig. 5, has around the top an outwardly and downwardly curved flange 27 which rests on the table around the opening; the body of the lid extending below the table.

Each coffee storing receptacle has a central outlet in the bottom. As best shown in Fig. 7, such outlet 28 is surrounded by a frusto-conical flange 29 pressed downwardly from the bottom wall of the receptacle. This flange, and an annular surrounding part of the bottom wall, rest on a complementary seat 30 in the top of a little cylindrical box 31; a rubber gasket 32 being interposed between the receptacle and the box. A plug 34 extends through the opening in the receptacle and is screwed into the box. The plug has a head 35 that fits the contour of flange 29 and therefore clamps the flange securely against the box. The plug contains an axial bore at least part of which is shaped to interlock the plug with a wrench or other member for turning the plug. In the arrangement illustrated, the wrench-engaging part 36 of the bore is square in cross section, as best seen in Fig. 6. Box 31 is attached to the inner end of a pipe or conduit 37 that extends through the front walls of the tank and casing. On the outer end of this pipe are a faucet 38 and a gauge 39 to indicate the level of the coffee in the storing receptacle.

Between the two faucets 38 is a third faucet 40 that is connected to the water tank by a tubular fitting 41, best shown in Fig. 6. A gauge 39, associated with faucet 40, indicates the water level in the heating tank.

Brewing is done in special receptacles set into the openings or pot holes 25 as illustrated in Figs. 8 and 11. Such a receptacle comprises an opend-ended cylindrical shell 42 of three different diameters. A short section 44, at the bottom, fits into hole 25. The intermediate section is of larger diameter than the lower section to provide between the two an annular horizontal part 45 that rests on the table. The uppermost section is of still larger diameter to create a second annular, horizontal shoulder 46 near the top of the shell. Adapted to rest loosely on shoulder 46 is a strainer 47 comprising a shallow pan provided with a perforated bottom. Adapted to rest on annular part 45 is a member 48 that forms the bottom of the coffee pot or extractor, as well as the filter to insure that no coffee grounds are carried with the brew into the storage receptacle. Member 48, as shown, consists of a flat bag 48$^a$ of filtering material and a stiff ring 48$^b$ within the bag. The bag may conveniently consist of two square pieces, a side of which is a little longer than the diameter of the ring. When this assembly is pressed down into the shell 42, it fits snugly within the intermediate section of the latter and comes to rest on shoulder 45. Therefore the brewed coffee is compelled to flow through two separate filtering sheets, since there is a good seal between the filter, as a whole, and the surrounding shell.

Water is delivered to the tank from a supply pipe 49 through an open pipe 50: pipe 49 containing a self-closing valve 51 controlled by an electromagnetic device 54, or through a bypass 52 provided with a manually operable valve 55.

Hot water is drawn from the tank by a pump 57 and discharged through a pipe 58 into a horizontal pipe 59 above the table and near casing wall 6. Pipe 59 terminates in spouts 60, 60, so positioned that each can discharge into one of the coffee pots or brewing receptacles standing over one of the storage receptacles 22 and 23. Panels 8 are provided with holes 8$^a$ through which the spouts project; the holes being large enough to allow the panels to swing without meeting interference from the spouts. Pipe 57 contains a manually operable valve 61. In pipe 58 are two electrically energizable valve devices 62 and 63, each adjacent to one of the spouts.

The pump mechanism and the manner of mounting it are illustrated in Fig. 10. A tube 65 of large diameter extends down from the table to within a short distance from the bottom of the water tank. The tube is fixed to the table and opens into the space above the latter. The housing 66 of a small centrifugal pump has on top a hub-like part 66$^a$ that fits into and is fixed in the lower end of the tube. An electric motor 67 is mounted directly above the table on suitable brackets 68. The pump shaft 68 extends up into the tube, and the motor shaft 69 extends downward into the tube in alignment with the pump shaft. A sleeve 70 surrounds the meeting ends of these shafts and is secured to both by set screws 71, 71. The upper of the two screws is above the table so as to be readily accessible from within the hood 7.

Gas for the burners is delivered to pipe 72 through a supply pipe 73 which contains two automatic valve devices 74 and 75. Valve 74, as will hereinafter be explained, is open whenever the temperature of the water in the tank is below a predetermined high level and closes when the temperature tends to go higher. Valve 75, on the other hand, is a safety device to shut off the gas in case the pilot light goes out.

The influence of the temperature of the water in the tank is exerted through an expansible fluid in a small container 76, shown in Fig. 5, which container is connected by a tube 77 to a control device 74$^a$ connected with the valve device 74. This is a conventional device.

Valve 75 is in series with valve 74 but is normally open so that gas may flow to pilot valve 20 through a small pipe 78. When valve 75 closes, flow to both main and pilot burners is shut off. As best shown in Fig. 8, there is beside the pilot burner, and under the influence of flame issuing therefrom, a conventional device 79 that generates a small electric current when heated. This current is conveyed to valve device 75 through a cable 80. So long as there is current, valve 75 remains open, but when the pilot light is extinguished, device 79 quickly cools and valve 75 closes.

Valve devices or instrumentalities 51, 55 and 62 all lie behind left hand panel 8 when the latter is in its vertical position; while devices or instrumentalities 63, 74 and 75 are similarly located with respect to right hand panel. The pump motor is located in the rear portion of hood 7. Normally, therefore, all these devices are concealed.

The electrical control system includes a main switch 81, the finger piece of which projects from the front wall of auxiliary casing 12, and push buttons 82 and 83, also in said wall. Associated with these elements are pilot lights 85, 86 and 87, respectively.

Other elements in the control system are vertically-adjustable probe-like electrodes A, B, C, D, and E that extend down through the table into the tank behind the left hand panel 8. These electrodes are all alike, except as to length. As best shown in Fig. 9, each electrode comprises a stem or rod 88 of electrically conductive material having at its lower end a head 89. The stem extends through a rubber bushing 90 fixed in a hole in the table, and is frictionally held in place. Loose on the stem, above the bushing, is a collar 91, that is held in place by a set screw 92. A wire (which in the case of electrode A is the wire 140 in the diagram) is soldered or otherwise fixed to the collar. The depth to which the electrode extends into the tank depends on the position of the collar on the stem.

Another electrode in the control system is best shown in Fig. 7, namely a stem 94 extending through a vertical wall of box 31 and having on the end within the box a thin head 95. Between this head and the wall of the box is a rubber washer 96. The hole in the box, through which the stem extends, contains a bushing 97 of insulating material. On the stem outside of said wall is a second rubber washer 98. On the stem outwardly from washer 98 is a sleeve 99 of hard insulating material. A nut 100, on the stem beyond sleeve 99, serves to clamp the box wall tightly between washers 96 and 98 and thus seal the joint between the electrode and the box. There are of course two of these electrodes, one for each box. To the outer end of the electrode is attached a conductor which, in the case receptacle 22, is 190 in the diagram. This wire is kept out of contact with water in the tank by a tube 101 of insulating material surrounding the same and a portion of the sleeve 99; a clamp 102 holding the tube on the sleeve.

The cabinet is provided with a cable 104 which may be plugged into any conventional outlet at the place of use of the apparatus, to supply the electricity used in operating the latter.

In addition to the parts heretofore described, various relays, transformers, condensers and the necessary wiring are provided. These elements and instrumentalities, with the exception of some of the wiring, are all housed in the auxiliary casing 12. As shown in Fig. 4, a cable 105 projects from the rear end of the auxiliary casing and terminates in a multiple plug 106. As shown in Figs. 3 and 5, there is fixed to wall 6 of the casing, above the pump motor, a multiple socket member 107 complementary to the plug, in order to couple the elements carried directly by the main casing to those housed in the auxiliary casing.

Since all of the elements and devices within the auxiliary casing are conventional, I have illustrated them simply in a diagrammatic form in Fig. 12, the wiring diagram.

In the diagram the two rows of thirteen small circles, distributed along the coupling members 106 and 107, represent, respectively, pins and sockets into which the pins are plugged. In the description of the diagram, each pin will be regarded as being in the corresponding socket, and the two wires so connected will be regarded as being a continuous wire.

In the diagram the main switch is open and therefore no current is flowing through the system.

Wires 108 and 109 lead from cable 104 to the opposite terminals of the primary winding of a main transformer 110. Starting switch 81 is in this circuit. One terminal of the secondary of this transformer is grounded through wire 112. A wire 113, connected to wire 108, leads to the thermostatically controlled double throw switch 74ª for the gas valve 74. By means of this switch wire 113 may be connected to either of two wires, 115 and 116, the first of which continues in series with the electromagnetic actuator 74ᵇ for the gas valve to a wire 117. Wire 117 extends in opposite directions from its juncture with wire 115, one branch leading to one terminal of actuator 54 for inlet water valve 51, while the other leads to that side of transformer primary 110 on which switch 81 is located. Wire 116 leads to one terminal of the pump motor 67, while a wire 118 extends from the other terminal of this motor to control devices in the lower half of the diagram.

From the foregoing it will be seen that when cable 104 is plugged into a line, current can flow therefrom through wire 109, switch 81, when the latter is closed, wire 117, wire 115, actuator 74ᵇ for gas valve 74, and switch 74ª, when water in the tank is cold and the latter switch is in the position shown, to wire 108 and back to cable 104. This turns on the gas for the main burner.

Current also flows through actuator 54 for inlet water valve 51 from wire 117, and thence through wire 119 that leads directly to two of six relays, numbered consecutively from 120 to 125. One path of travel for the current is through a switch 127 forming part of the relay 121, wire 128, switch 129 forming part of relay 120, wire 130, switch 131 forming part of relay 125, and through wire 132 to wire 108.

A second path for current to energize actuator 54 is from wire 119 directly to wire 134, through switch 135, forming part of relay 122, and wire 136, to wire 108.

Therefore, as soon as switch 81 is closed, two paths are made available for current to energize actuator 54 and open the water inlet valve.

The pump to transfer water from the heating tank to the brewing receptacles cannot be operated until the water in the tank becomes hot and switch 74ª shifts to the opposite position from that occupied in the diagram.

There are also other devices for controlling the pump. Wire 118 extends from the second terminal of the pump motor to the middle of a wire 137. This latter wire is connected at its ends to the movable members of switches 138 and 139, respectively. Switch 138 is associated with relay 121, while switch 139 is similarly related to relay 120; both switches being open while the corresponding relays remain deenergized. Accordingly, one or the other of these two relays must be energized before the pump can start.

On of the controlling factors in opening and closing the inlet water valve is the water in the tank. Electrode A determines the upper level that may be attained by the water. Unless the tank is full at the time switch 81 is closed, water immediately starts to flow into the tank, continuing to do so until it reaches this electrode.

The tank being grounded, a circuit may then be traced from the ground, through the tank, water and electrode A to wire 140. This wire is connected to one terminal of the primary of a small transformer 141; the other terminal of which is connected by wire 142 to the secondary of main transformer 110. Consequently, current induced in secondary of transformer 110 flows through the primary of transformer 141 and induces a current in the secondary of that transformer. The secondary of transformer 141 is part of a closed circuit 145, containing a rectifier 146 and connected with a condenser 147. A portion of this circuit is the coil 148 for actuating relay 122.

When relay 122 is energized switch 135 is opened and switches 149, 150 and 151 are closed. Therefore, one path for the current for energizing actuator 54 for the water inlet valve is interrupted at switch 135 of relay 122 and, if there be no other path available, the inlet valve closes. The aforesaid second path for such energizing current has, however, been broken at switch 131 in relay 125 before the water in the tank reaches electrode A. This was done when the water rose into contact with electrode B which terminates at the same level as does electrode A. Upon such contact being made, there is established a circuit from ground, through the tank, water and electrode B to wire 152, through the primary of a transformer 153, similar to transformer 141, through wire 142 and through the secondary of transformer 110 to ground. Transformer 153 energizes a closed circuit 154 which contains an actuating coil 155 for relay 125. Thus relay 125 is caused to operate and open switch 131; at the same time closing switch 156. Consequently water inlet valve must close.

Closing of switch 156 completes a circuit through electrode C that extends farther down into the tank than do electrodes A and B; a circuit extending from ground through the tank, water and electrode C through wire 157, switch 156 and wire 158 to wire 152, with the remainder of the circuit the same as the B electrode circuit just described, beginning with wire 152. Therefore relay 125 remains energized after the water recedes below electrodes A and B and until electrode C is clear of the water; when the water level recedes this relay is again deenergized. The purpose of this feature will be explained later.

As will hereinafter appear, relay 122 must remain energized while the tank is being emptied, so that the circuit for cold water valve 54 shall remain broken at switch 135. Therefore grounded electrode D is connected to switch 149 in this relay by wire 143 so that, as soon as the relay has been energized by reason of the water level in tank rising to electrode A, wire 143 is connected to wire 140, transformer coil 141, wire 142 and through the secondary of transformer 110, to ground. Therefore, when the water level recedes below electrode A, as hot water is withdrawn from the tank, relay 122 remains energized.

After the tank has been filled to the desired level and the water has been heated to the brewing temperature, the pump may be caused to deliver a predetermined quantity of the water into either brewing receptacle; this quantity being determined by the vertical distance between the lower ends of electrodes A and D.

Assuming that the left hand receptacle 22 is selected, the operator momentarily presses button 82 and a circuit may be traced as follows: from the right hand side of the push button through wire 159, switch 160 forming part of relay 123, wire 161, energizing coil 162 for relay 120, wire 164, switch 165 in relay 121, wire 166, switch 151 in relay 122, to ground; and from ground at the secondary of transformer 110, through that element, through wire 142 to wire 167 that contains a rectifier 168 and leads to the left hand side of push button 82.

Current flowing through the circuit just traced energizes relay 120 and closes switch 139 which previously was open. As a result, the energizing circuit for pump motor 67, which was interrupted at switch 139, now continues through this switch, through wire 166, wire 170, main switch 81, and wire 109 to cable 104.

The pump has now been energized and pumps hot water into pipe 58 at a point between the two valves 62 and 63. Since valve 62 controls the flow of water into the left hand brewing receptacle, this valve must open at the time the pump starts.

In the diagram the right hand terminal of the actuator for valve 62 is grounded through wire 168. Wire 169 leads from the left hand terminal to closed switch 173 in relay 120, through a wire 174 that is connected to wire 142 near the main transformer 110, and through the secondary of that transformer and wire 112 to ground. Therefore valve 62 opens and hot water begins to flow into the left hand brewing unit.

Pumping continues until an accurately measured quantity of water has been delivered into the brewing receptacle, namely, until the water level in the tank drops just below the lower end of electrode D and relay 122 is deenergized to break the pump circuit.

This deenergization occurs as follows: When relay 122 was energized, as the water rose in the tank to contact electrode A, there was immediately established a holding circuit for that relay, independent of that electrode, by connecting wire 140 to electrode D through wire 143 and switch 149 in relay 122. Then, when the water recedes to the low level this holding circuit is broken.

It should be noted that as soon as relay 120 is energized, upon pressing push button 82, a holding circuit for that relay is established, so that the button need be held down only momentarily, as follows: Starting with grounded wire 112, through the secondary of transformer 110, wire 142, wire 167, which merges into wire 175, wire 176, switch 177, wire 161, coil 162, wire 164, switch 165, wire 166 and switch 151 to ground. When, later in the cycle, relay 122 is deenergized, switch 151 opens and relay 120 is likewise deenergized. Therefore when the requisite amount of water has been pumped into the left hand brewing unit, the inlet automatically opens to refill the tank.

Provision is made to prevent the introduction of water into a brewing receptacle until the coffee storing receptacle below the same has been emptied of a previously made brew. This is accomplished through the electrodes 94 in the outlets from the bottoms of the coffee storing receptacles 22 and 23.

Receptacles 22 and 23 are grounded in the water in the tank. Therefore, as soon as any coffee entered receptacle 22 it made contact with the local electrode and grounded the same, closing the circuit as follows: from grounded electrode 94 in receptacle 22 through wire 180, the primary of a small transformer 181, through wire 182 and the secondary of transformer 110 to ground. The secondary of transformer 181 is in a closed circuit 184 containing the actuating coil of relay 123, together with a rectifier 185. Therefore relay 123 is energized and switch 160 is opened. Therefore relay cannot again be energized by pressing button 82 until after the coffee has all been drained from receptacle 22, so that relay 123 is again deenergized.

Relay 121 is exactly like relay 120 and bears the same relation to the operation of brewing coffee in the right hand unit of the apparatus as does relay 120 with respect to the left hand unit. Therefore, since the energizing of relay 120 requires that relay 121 be deenergized, so that switch 165 remains closed, no coffee brewing cycle can be started in the left unit while water is being pumped into the brewing receptacle at the right. So, also, the energizing circuit for actuating coil 186 for relay 121 includes a wire 187 connected to a switch 188 which forms part of relay 120; this latter switch being closed only while the actuating coil for the latter relay is deenergized. Therefore no water can be pumped into the right hand brewing receptacle while water is flowing into the left hand receptacle.

Relay 124 is a counterpart of relay 123, the circuit controlled by push button 83 including a wire 189 leading to switch 190 in relay 124, so that no coffee can be brewed on the right side until the storage receptacle 23 has been emptied. Relay 124 is energized, when there is coffee in receptacle 23, through grounded electrode 94, wire 191, transformer 192, wire 194, wire 182, and secondary of transformer 110 to ground. The coil of this relay is in series with the secondary of transformer 192, in a closed circuit 195.

Relays 122 and 125 serve the same functions regardless as to which of the two push buttons initiates a brewing cycle.

When coffee is brewed in the right unit the steps are identical with those just described, except that it is relay 120 that prevents the starting of a brewing cycle upon pressing button 83 unless that relay is in a deenergized state.

Pilot light 85 is connected directly across the terminals of the secondary of transformer 110, so it shows whether or not the current has been turned on. The circuit for pilot light 86 passes through switch 196 on relay 120 and the circuit for pilot light 87 passes through switch 197 on relay 121; neither of these two switches being closed except when the corresponding relay is energized. So, if one of the buttons is pressed and the corresponding pilot light shows no illumination, it is an indication that conditions are not yet right for starting a new brewing cycle.

Sometimes it may be desired to brew a smaller amount of coffee than is required to fill one of the receptacles 22 and 23. By the addition of electrode E, shorter than electrode D, one half or other desired fraction of the full amount may be brewed. Electrode E is connected to wire 143 by a wire 198 beyond a manual switch 199 for creating a break in wire 143 between electrode E and the juncture of these two wires. When the switch is closed, electrode D controls and, when the switch is open, the control passes to electrode E and the lesser amount of coffee is brewed during each cycle. It would of course be possible to produce the same result by adjusting electrode A or D, or both of them, but it is not good practice for the user to disturb the accurately made initial adjustments for the mere advantage of occasionally brewing a lesser quantity of coffee.

It is desirable for the user to be able to draw off a few cups of hot water for making tea, without variation in the amount of water delivered for brewing during the usual cycle. As heretofore explained, one path for current to energize the inlet water valve is through switch 135 in relay 122 and the other through switch 129 in relay 120 and switch 131 in relay 125. The first of these paths is interrupted when the water rises to electrode A. The second path remains established so long as the water contacts electrode C and relay 120 remains deenergized. Therefore, while the tank is full, with relay 125 energized and relay 120 deenergized, water may be withdrawn through faucet 40 down to the level of the lower end of near-high level electrode C. During this recession the inlet valve opens to let more water into the tank. No more water can enter, however, should the level recede below the lower end of electrode C.

This replenishing of the water in the tank must be effected before the push button is pressed, since this causes relay 120 to become energized and the switch 129 to open. Therefore, in ordinary operation there is no addition of water after the tank has been filled, until it has been emptied again, and the amount of water used for each brewing is accurately measured by the adjustment of electrodes A and D.

It will be seen that the only instrumentalities that are connected directly into the main current-supplying line are the actuator for the water inlet valve, the pump motor, and the primary of the main transformer, so that the rest of the system is isolated. Thus, the cabinet containing the apparatus being grounded, no one touching the cabinet, water, coffee or other part, and himself being grounded, can be injured by the current in the system; the transformer and the relay switches through which flows the energizing current for the inlet water valve and the motor being sealed in the auxiliary casing, and therefore, out of reach.

It will also be seen that, while only alternating current flows through the electrode, the actuating coils for all of the relays are energized by direct current; direct current being preferable for holding the relays and being unsatisfactory in circuits that include water and coffee.

It is believed that no further general explanation is needed with respect to the steps of filling the tank with water, heating the water and brewing the coffee. It should be noted, however, that after the apparatus is put into operation, the tank is automatically filled after each withdrawal of sufficient hot water for one brewing, and that the water is kept hot, so long as the main switch remains closed. Therefore, as soon as one storage receptacle is emptied, a new brewing operation to fill that receptacle may be begun upon pressing the proper button, provided that the tank has been filled and the water properly heated. It should also be noted that the storage receptacles extend down into the water, even at its lowest level, thus keeping the coffee hot.

There are, however, novel features in the actual brewing that will be explained.

As shown in Fig. 8, the water is delivered into the rear part of strainer 47 in the brewing receptacle. Because of many small holes 47ª, this water is evenly distributed as it rains down upon a loose mass 200 of ground coffee on the filter 48. Therefore the ground coffee is unconstrained and forms the sole barrier between the incoming hot water and the filter, and great efficiency and completeness in brewing is achieved.

The filtering of the coffee is also done very effectively and efficiently, because any fines that may escape through the upper filter sheet can easily be filtered out of the coffee by the lower sheet.

The filtering unit not only provides effective filtering of the coffee that passes through the same, but it also insures that no water or coffee can leak down past the periphery of the filter. This is due to the fact that the filtering cloth cannot anywhere slip out from between the clamping ring and the surrounding shell as often happens when a loose sheet of filtering material is used.

After all of the coffee has passed down into the storing receptacle, the brewing receptacle is removed and the lid or cover 26 is applied to opening 25. When a simple flat lid is used the coffee loses flavor and aroma. I have found that by allowing the body of the lid to extend down into the storage receptacle this loss is avoided. I believe the reason for this is that while, with the conventional lid, the rising vapors are quickly cooled by the lid, the reentrant lid remains hot and after its first contact with such vapors; thereby allowing the vapors to circulate past the lid without substantial temperature changes therein.

It will thus be seen that my improved apparatus is efficient to operate and has a high safety factor; the latter characteristic being due to the use of isolated electric circuits where contact with water, coffee or other energized thing might otherwise subject to a shock the person making such contact. Where gas is used for heating the water no gas can be discharged in case the pilot flame is extinguished, and therefore all danger of explosion of accumulated gas in the cabinet is eliminated. Since no steam is generated in the system explosions due to high pressure steam are avoided.

Efficiency in operation results from the accuracy with temperature and volume, with respect to the water, are controlled, and from the interlocks that prevent the making of coffee on coffee in a brewing unit or the robbing of one unit to supply the other, or the starting of a brewing operation until there is available the right quantity of water at the right temperature.

Loss in efficiency due to the accumulation of scale on the walls of the tank may be defeated by keeping the tank clean. This can easily be done because of the ease with which the table may be removed to give free access to the interior of the tank.

I claim:

1. The combination with an apparatus for making coffee, containing a tank, two brewing receptacles, heating means for the tank, an electric pump connected to the tank and to each of said receptacles, an inlet valve for admitting water to the tank, a hot water valve in each of the connections between the pump and the receptacles, and electrical actuators for said valves: of a control system including a high level and a low level electrode in the tank, a manually operable main switch for connecting the system to a source of electric current, a first push button switch and a second push button switch, and three electrically energizable relays; a heater controlling circuit that is closed when the main switch closes; an energizing circuit for the inlet valve including a switch on the first relay which remains closed while that relay remains deenergized; an energizing circuit for said first relay completed through the high level electrode when the water level in the tank reaches that electrode; a holding circuit for said first relay including the low level electrode and a switch on that relay that closes upon energization of the latter; two circuits, one of which includes the coil of the second relay while the other includes the coil of the third relay, each controlling the pump and one of the hot water valves and being, in turn, controlled by the corresponding push button; and a switch on the first relay, open when that relay is deenergized, controlling both of the last mentioned circuits.

2. The combination with an apparatus for making coffee, containing a tank, two brewing receptacles, heating means for the tank, an electric pump connected to the tank and to each of said receptacles, an inlet valve for admitting water to the tank, a hot water valve in each of the connections between the pump and said receptacles, and electrical actuators operatively related to said valves: of a control system including a high level electrode and a low level electrode in the tank, a manually operable main switch for connecting the system to a source of electric current, a first and a second push button switch, and three relays having energizing coils; a heater-controlling circuit that is closed by the main switch; an energizing circuit for the inlet valve including a switch on the first relay which remains closed while that relay remains deenergized; an energizing circuit for said first relay completed through the high level electrode when the water level in the tank reaches that electrode; a holding circuit for said first relay including the low level electrode and a switch on that relay that closes upon energization of the latter; two circuits, one of which includes the coil of the second relay while the other includes the coil of the third relay, each controlling the pump and one of the hot water valves and being controlled, respectively, by the first push button and the second push button; a bypass for each push button, including a switch on the corresponding relay that is closed when that relay is energized; and a switch on the first relay, open when that relay is energized, controlling both of said two circuits.

3. An apparatus as set forth in claim 2 having, in addition, a second high level and an intermediate level electrode for contact with water in the tank; a fourth electrically energizable relay; a circuit for energizing said relay when the water in the tank reaches the second high level electrode; the fourth relay having a switch that is in the circuit for energizing the inlet valve and is closed only when that relay is deenergized; a holding circuit for the fourth relay being established through the intermediate level electrode and a switch on the latter relay and which is closed when the other switch on that relay is open.

4. An apparatus as set forth in claim 2, wherein the brewing receptacles have bottom outlets, and wherein there are electrodes in said outlets, two additional electrically energized relays each having a switch to control the circuit in which the corresponding push button is located; and a circuit controlled by each of said electrodes to energize that additional relay which corresponds to the receptacle with which that electrode is associated; whereby when a receptacle has been filled and the corresponding hot water valve has been closed that valve cannot be opened until the receptacle has been emptied.

5. In a coffee making apparatus, a main casing provided with instrumentalities for brewing and storing coffee, receiving and heating water and delivering hot water to the brewing means; the same including electrically operated valves and an electrically operated pump, level selecting electrodes and a temperature responsive switch; an auxiliary casing detachably mounted on the main casing and housing control devices for said instrumentalities, including electrically operated relays, switches and transformers; a wiring system for said instrumentalities and said devices; a connector for wires including a multiple socket member on one of the casings and a complementary multiple plug on the other casing; and each wire that crosses from one casing to the other being in sections coupled together at the connector.

6. The combination with an apparatus for making coffee, containing a tank, a brewing receptacle, means to deliver water from the tank to said receptacle, a self closing valve for admitting water to the tank, and an electrical actuator for said valve: of a control system including a high level and a low level electrode in the tank, a manually operable main switch to connect the system to a source of electric current, a push button switch and two electrically energizable relays; an energizing circuit for said valve actuator including a switch on the first relay closed only when that relay is deenergized, to cause the valve to open; an energizing circuit for the first relay that is completed when the water in the tank reaches the high level electrode and thereby causes the energizing circuit for the valve actuator to be broken and the valve to close; a holding circuit for the first relay closed when that relay is energized; an energizing circuit for the means that delivers water to the receptacle including a switch on the second relay closed only when that relay is energized; an energizing circuit for the second relay including a push button switch and a switch on the first relay closed only when that relay is energized; and a push button switch bypass in the latter circuit including a switch on the second relay closed only when that relay is energized.

7. The combination set forth in claim 6, wherein the system is adapted to receive alternating current, and the energizing and holding circuits for the relays contain rectifiers, so that only direct current flows through the energizing coils of the relays, whereas alternating current flows through the electrodes and all of the other circuits.

8. The combination set forth in claim 6, wherein the immediate energizing circuit for the first relay is a closed circuit and contains the secondary of a transformer and rectifying means, the electrodes are grounded through water in the tank, and the circuits that are so grounded contain the primary of said transformer, whereby only alternating current flows through the electrodes and only direct current flows through the energizing coil of the first relay when the incoming current is of the alternating type.

9. The combination as set forth in claim 6 having, in addition, a third electrode disposed at the bottom of the receptacle in position to be contacted by coffee so long as any coffee remains in the receptacle, a third relay, a circuit including that electrode and energizing the third relay whenever the receptacle contains some coffee, a switch on the third relay that is open when that relay is energized and closed when the relay is deenergized; and the last-mentioned switch being in series with the push button switch to render the latter ineffective to complete any circuit if closed while any coffee remains in the receptacle.

10. The combination with an apparatus for making coffee, containing a tank, a brewing receptacle, a heater for the tank, a motor pump having an inlet drawing water from the tank and delivering it into the receptacle, a self-closing inlet valve for the tank, and an electrical actuator for opening said valve: of a control system including a high level and a low level electrode associated with the tank, a manually operable switch to connect the system to a source of electric current, a push button switch and two electrically energizable relays; a heater circuit for energizing the heater when the first mentioned switch is closed; an energizing circuit for said valve actuator including a switch on the first relay closed only when that relay is deenergized, to cause the valve to open; an energizing circuit for the first relay that is completed when the water in the tank reaches the high level electrode and thereby causes the energizing circuit for the valve actuator to be broken and the valve to close; a holding circuit for the first relay including the low level electrode and a switch on the first relay closed when that relay is energized; an energizing circuit for the pump including a switch on the second relay closed only when that relay is energized; a switch, responsive to temperature changes in water in the tank, common to both the heater circuit and the pump energizing circuit to break one of these circuits and close the other at predetermined temperature limits; an energizing circuit for the second relay including the push button switch and a switch on the first relay closed only when that relay is energized; and a push button bypass in the latter circuit including a switch on the second relay closed only when that relay is energized.

11. The combination with an apparatus for making coffee, containing a tank, a brewing receptacle, means to transfer water from the tank to the receptacle, a self-closing inlet valve for the tank, and an electrical actuator for opening said valve: of a control system including a high level electrode, a near-high level electrode and a low level electrode in the tank, a manually operable main switch to connect the system to a source of electric current, a push button switch and three relays; an energizing circuit for said valve actuator including switches on the first and third relays, closed only when those relays are deenergized, to cause the valve to open; an energizing circuit for the first relay completed when water in the tank reaches the high level electrode and thereby causes the energizing circuit for the valve actuator to be broken and the valve to close; a holding circuit for the first relay including the low level electrode and a switch on the first relay closed when that relay is energized; an energizing circuit for the means which transfers water to the receptacle, including a switch on the second relay closed only when that relay is energized; an energizing circuit for the second relay including the push button switch and a switch on the first relay closed only when that relay is energized; a push button bypass in the latter circuit including a switch on the second relay closed only when that relay is energized; and an energizing circuit for the third relay including the near-high level electrode and closed thereby while that electrode remains in contact with water in the tank to permit the inlet valve to open and replace small quantities of water withdrawn from the filled tank before the push button switch is operated to start a pumping cycle.

References Cited in the file of this patent

UNITED STATES PATENTS

| | | |
|---|---|---|
| 755,041 | Peterman | Mar. 22, 1904 |
| 1,389,298 | Farmer | Aug. 30, 1921 |
| 1,554,612 | Wilson | Sept. 22, 1925 |
| 1,646,746 | Carroll | Oct. 25, 1927 |
| 1,796,518 | Glascock | Mar. 17, 1931 |
| 1,929,231 | Yirava | Oct. 3, 1933 |
| 1,972,164 | Pierce | Sept. 4, 1934 |
| 2,123,331 | Fromwiller | July 12, 1938 |
| 2,202,197 | Ewertz | May 28, 1940 |
| 2,216,518 | Parsons | Oct. 1, 1940 |
| 2,299,809 | Ershler | Oct. 27, 1942 |
| 2,360,194 | Bright | Oct. 10, 1944 |
| 2,377,363 | Noble et al. | June 5, 1945 |
| 2,394,885 | Baak | Feb. 12, 1946 |
| 2,457,903 | Kantor et al. | Jan. 4, 1949 |
| 2,487,933 | Martin | Nov. 15, 1949 |
| 2,488,817 | Kaminky | Nov. 22, 1949 |
| 2,490,501 | Ashender | Dec. 6, 1949 |
| 2,493,932 | Swanson | Jan. 10, 1950 |
| 2,511,682 | Allen | June 13, 1950 |
| 2,524,261 | Kaminsky | Oct. 3, 1950 |
| 2,544,836 | Hotvedt | Mar. 13, 1951 |
| 2,568,840 | Zees | Sept. 25, 1951 |
| 2,612,180 | Schwartz-Kopf | Sept. 30, 1952 |
| 2,613,588 | Swanson | Oct. 14, 1952 |
| 2,639,078 | Karlen | May 19, 1953 |
| 2,641,992 | Clemens | June 16, 1953 |
| 2,644,478 | Calabrese | July 7, 1953 |